United States Patent [19]

Kader

[11] 3,901,836
[45] Aug. 26, 1975

[54] RUST PREVENTATIVE COATING FOR METALLIC SURFACES CONSISTING OF WATER-SOLUBLE RESIN AND SODIUM BENZOATE-POTASSIUM TRIPOLYPHOSPHATE RUST INHIBITOR

[75] Inventor: John A. Kader, Cleveland, Ohio

[73] Assignee: Chem-Paint Specialties, Inc., Cleveland, Ohio

[22] Filed: Oct. 4, 1973

[21] Appl. No.: 403,629

[52] U.S. Cl. ...260/17 R; 260/29.6 BE; 260/29.6 HN; 260/29.6 MP; 106/14
[51] Int. Cl.[2] .............................................. C09D 5/08
[58] Field of Search ..106/14; 260/29.6 MP, 29.6 BE, 260/29.6 BM, 17 R, 29.6 HN

[56] References Cited
UNITED STATES PATENTS

| | | | |
|---|---|---|---|
| 2,478,756 | 8/1949 | Elder | 252/75 |
| 2,711,391 | 6/1955 | Kohler | 210/23 |
| 3,036,934 | 5/1962 | Horton | 106/14 |
| 3,067,044 | 12/1962 | Johnson et al. | 260/29.6 MP |
| 3,248,350 | 4/1966 | Triggle | 260/29.6 MP |
| 3,523,835 | 8/1970 | Turner | 106/14 |

FOREIGN PATENTS OR APPLICATIONS 230,197 7/1959 Australia.................... 260/29.6 MP

OTHER PUBLICATIONS

"Corrosion and Corrosion Control" — H. Uhlig — Second Edition — 1971 — pp. 260-263 — John Wiley & Sons.

*Primary Examiner*—Melvin Goldstein
*Assistant Examiner*—Peter Kulkosky
*Attorney, Agent, or Firm*—Oldham & Oldham Co.

[57] ABSTRACT

A rust preventative for ferrous surfaces comprises by weight from 15 to 75% of phosphoric acid, from 5 to 25% of a water soluble resin, from 5 to 20% of a rust inhibitor wherein the rust inhibitor contains from 25 to 95% of sodium benzoate and from 5 to 75% of potassium chromate, potassium dichromate or potassium tripolyphosphate, from 1 to 10% of a wetting agent and an amount of water to bring the total amount of ingredients to 100%.

12 Claims, No Drawings

RUST PREVENTATIVE COATING FOR METALLIC SURFACES CONSISTING OF WATER-SOLUBLE RESIN AND SODIUM BENZOATE-POTASSIUM TRIPOLYPHOSPHATE RUST INHIBITOR

BACKGROUND OF THE INVENTION

The present invention relates to a composition for preventing the formation of rust on ferrous surfaces. More specifically, the present invention relates to a composition which converts existing rust on an iron or steel surface to a film tightly bonded to the surface and which prevents the formation of rust on iron or steel surfaces including the bonded film surface.

Heretofore, numerous compounds have been made to prevent the formation of rust on various ferrous materials and surfaces such as those commonly made of iron and steel. Although such materials are effective over a short period of time, they generally break down or fail to provide protection over any substantial period of time. Moreover, such compounds tend to contain costly ingredients and are unsuitable for applying paint coatings thereover.

Many compounds have been made in the past to provide a manner of removing rust or steel from ferrous materials without requiring the aid of any manually or power operated devices. These compounds, of course, were designed to avoid the normal requirement of removing the rust from the ferrous surface to a depth which was free of oxidation. However, these compounds suffer from drawbacks such as the fact although removing the rust from the surface would leave material that hastened oxidation thereof unless the compound was quickly removed, the fact that although the rust was removed from the surface no protective coating was left to preclude subsequent rusting, the fact that some sort of scrapping or removal operation was required before the treatment of the compound, the fact that such compounds contained expensive ingredients and were therefore costly, as well as the fact that any coating left after the removal of the rust was poor in preventing the reformation of rust without the application of a coating of another material. The removal and prevention of rust formation is important wherever ferrous type materials are utilized and particularly in articles such as automobiles, bridges, maintenance structures such as guardrails, etc., appliances, ships and the like. Concerning automobiles wherein the rust tends to occur from the inside out such as in fenders, inside of doors, quarter panels, and rocker panels the application of these compounds is often difficult since they are viscous and as such cannot be readily sprayed and when cut with solvents, present harmful, toxic, flammable and harmful vapors.

A specific type of compound which has been utilized to solve the rust problem on ferrous surfaces and to provide a substrate upon which protective coating such as paint may be applied are phosphorous containing compounds such as phosphoric acid. Such compounds would react chemically with the rust or iron oxide to provide a phosphate film which was bonded to the article containing the ferrous surface. However, such film is generally too porous to serve as an effective compound preventing subsequent rusting and for providing a firm base upon which subsequent protective coating can be applied. In order to overcome this problem, various modifiers have been incorporated into the phosphoric compound. However, various drawbacks still exist such as the failure of such modified compounds to effectively remove the rust from the surface of the metal and to replace it with a protective film. Moreover, often a white deposit remained on the material thereby detracting from the appearance of the product and preventing the firm bond between the film and a subsequently applied coating. Additionally, even such modified coatings do not tend to provide protection over a substantial period of time.

SUMMARY OF THE INVENTION

It is, therefore, an object of the present invention to provide a rust resistant composition.

It is another object of the present invention to provide a rust resistant composition which when applied to rusty surfaces of a ferrous article or product, reacts with the rust to form a film tightly bound to the surface.

It is a further object of the present invention to provide a rust resistant composition which when applied to rusted surfaces prevents the reformation of rust for substantial periods of time.

It is a still further object of the present invention to provide a rust resistant composition which is inexpensive, readily applied, air dried and non-polluting.

These and other objects of the present invention are described in detail without attempting to discuss all of the various modifications in which the invention might be embodied; the invention being measured by the appended claims and not by the details of the specification.

In general, the rust preventative composition contains by weight from about 15 to about 75% of phosphoric acid, from about 5 to about 25% of a water soluble resin, from about 5 to about 20% of a rust inhibitor made from 25 to about 95% of sodium benzoate and from 75 to about 5% of either potassium chromate, potassium dichromate, or potassium tripolyphosphate, from about 1 to about 10% of a wetting agent and an amount of water to bring the total amount of the ingredients to 100%.

DESCRIPTION OF THE PREFERRED EMBODIMENTS

A rust preventative according to the concepts of the present invention not only inhibits the formation of rust and applies a good base coating for the application of a protective coating if desired, but also forms a good protective coating over rusted spots by chemically reacting with the rust and forming a tightly bonded protective film. The rust preventative is ideally suited for ferrous surfaces including iron and a host of various steels and also may be used for metals such as copper, brass aluminum and the like to prevent oxidation thereof. The rust preventative of the present invention contains phosphoric acid to react with any rust spot or surfaces and form a phosphorous film. A desirable range of phosphoric acid extends from about 15 to about 75% based upon a conventional 85% grade concentration with the higher end of the range being preferred wherever heavily rusted surfaces are encountered. A preferred range extends from about 20 to about 30% with an optimum amount being approximately 25% by weight for typical applications.

In general, a rust preventative according to the present invention can be readily summarized by the following formulation:

| INGREDIENT | PERCENT BY WEIGHT |
|---|---|
| Phosphoric Acid (85% grade) | 15 – 75 |
| Water Soluble Resin | 5 – 25 |
| Rust Inhibitor | 5 – 20 |
| Wetting Agent | 1 – 10 |
| Water | Remainder to equal 100% |

The water soluble resins may generally be any conventional resin material. As well known to one skilled in the art, resins are polymeric materials whose composition enables them to dissolve in water. Such resins are usually synthetic and prepared by polymerization reactions in which chain growth results from the breaking of ring structures or double bonds in monomeric materials. Examples of specific types of water soluble resins include:
Carboxmethylcellulose
Hydroxmethylcellulose
Methylcellulose
Polyvinyl Alcohol
Polyacrylamide
Polyvinylpyrrolidone
Polyethylene Oxide
Polyethyleneimine
Polyvinyl Methyl Ether
Carboxylic Polymers.

The resins which are highly preferred in the present invention are polyvinyl alcohol and the carboxylic polymers. Many of the various polyvinyl alcohol resins are manufactured by DuPont under the name Elvanol 70-05. The preferred water soluble carboxylic polymers contain carboxylic groups as either the free acid or as monovalent salts. Specifically preferred are very high molecular weight non-linear carboxylic polymers of the type carboxypolymethylene manufactured by B. F. Goodrich Chemical Company under the name Carbopol 934. Another preferred resin are the Goodrite resins produced by Goodyear according to a secret formulation. These three families of water soluble resins serve as excellent binders and have been found to produce very tight films. That is, the films or coatings of the present invention are not porous so as to permit oxidation. As set forth in the above formulation, a desirable amount of water soluble resin ranges from about 5 to 25% with 5 to about 15% being preferred. A value of approximately 10% has been found to produce a highly desirable formulation.

The range of the rust inhibitor varies from about 5 to about 20% with approximately 10% being preferred. The composition of the rust inhibitor is set forth in my copending patent application bearing U.S. Ser. No. 296,915, and consists of a mixture of two types of compounds. One of the compounds is sodium benzoate and the other compound is selected from the group consisting of potassium chromate, potassium dichromate and potassium tripolyphosphate. Generally, the sodium benzoate may range from 25 to about 95% by weight with good results generally being obtained from a range of about 65 to about 90% of the total mixture. An optimum amount is approximately 80% of sodium benzoate the remaining 20% being either one of the three potassium compounds. Due to the strict modern day pollution laws, it often will be necessary and desirable to use the sodium benzoate-tripolyphosphate mixture as the rust inhibitor.

In order to prevent beading of the above formulation and to facilitate the application of the rust preventative on the metal surface as well as to cracks and crevices such as in the rust proofing of automobile bodies, a wetting agent is utilized. The use of a wetting agent will insure that a uniform film is formed throughout the treated metal surface generally regardless of the type of application be it for appliances, heat exchangers or any other situation wherein the prevention of rust or oxidation is desired. The suitable wetting agent range is from about 1 to about 10% with approximately 5% being preferred. Generally any conventional wetting agent can be used such as the sodium dialkyl sulfosuccinates, the naphthalenesulfonates and others. A very preferred class is the sodium alkyl sulfates such as those manufactured by Union Carbide under the name Tergitol. Specific examples of this particular class of anionic surfactants include sodium heptadecyl sulfate, (Tergitol 7), sodium tetradecyl sulfate, (Tergitol 4), and a highly preferred wetting agent, sodium 2-ethylhexyl sulfate (Tergitol 08). Generally, this class of wetting agents are neutral, that is, having a ph of about 7.

The rust preventative formulation further includes an amount of water to bring the total amount of the ingredients to 100%, that is, based upon 100 parts by weight of the formulation, the remaining amount is the amount of water utilized. Thus, a compound according to the formulation of the present invention can be prepared without the presence of water and hence in a concentrated form and so packaged and distributed. Hence, upon usage, the required amount of water may be added and the rust preventative applied to the various surfaces including various steels and iron alloys which show signs of rust. Additionally, the rust preventative can be applied to various non-rusted iron and steel surfaces to prevent oxidation and furthermore may be applied to the surfaces of other metals such as copper, aluminum, brass, and the like to prevent oxidation.

The rust preventative according to the above formulation is very easy to prepare as well as to apply since it can be brushed on, dipped on or sprayed through various conventional spraying equipment. The formulation will air dry to a generally clear type film in a matter of several minutes and give years of protection. A particular use of the above formulation is in the rust proofing of automobiles. Since the rust preventative can be readily sprayed, small holes may be drilled into various parts of an automobile such as the rocker panels, the quarter panels and between the inner and outer fenders with the material then being applied and the holes being covered by a rubber insert. The particular formulation is particularly useful in that since the phosphoric acid tends to eat rust, that is react with the ferrous oxide to form a phosphate film, the rust preventative may be applied to automobiles wherein rusting has already commenced such as until about one year of age and still form a good protective coating. Of course, the rust preventative may be used for numerous other applications including appliances, steel products and the like. Since the binder, particularly the preferred polyvinyl alcohol (Elvanol) and the carboxylic resin (Carbopol), form a tightly knit film with good adhesion to the metal surface and the rust inhibitor, which generally has no equivalence prevents, retards oxidation, the rust preventative inhibits the formation of rust for substantial periods of time. Additionally, such rust formation is prevented throughout the entire product since the wetting agent insures that the application of the film is throughout the surface of the metal as well as in cracks and crevices and other small openings.

The invention will be more fully understood by reference to the following examples which set forth the preparation as well as the results obtained from the above rust preventative formulation.

EXAMPLES 1–12

To a container was added by weight the following amount of ingredients:

| INGREDIENTS | PERCENT |
|---|---|
| Phosphoric Acid | 25 |
| Resin (Elvanol 70-05) | 10 |
| Rust Inhibitor | 10 |
| (Sodium Benzoate/Potassium Tripolyphosphate 80/20) | |
| Wetting agent (Tergitol 08) | 5 |
| Water | 50 |

These ingredients were mixed in the rust preventative solution and applied to 12 panels of 20 gauge steel, 6 having slight rust spots and the remaining 6 containing no rust. After exposure to the atmospheres for 6 months, no signs of rust appeared on any of the panels.

Similarly, rust preventative solutions were prepared using the same amount of ingredients but utilizing potassium dichromate and potassium chromate in lieu of potassium tripolyphosphate. Yet other samples were prepared using Carbopol 934 as the resin with the various potassium compounds used for the rust inhibitor. Coated panels showed no signs of rust after 6 months of testing.

It can be seen that the disclosed invention carries out the objects of the invention set forth above. As will be apparent to those skilled in the art, many other modifications can be made without departing from the spirit of the invention herein disclosed and described; the scope of the invention being limited solely by the scope of the attached claims.

What is claimed is:

1. A rust preventative for metallic surfaces comprising by weight from about 15 to about 75% of phosphoric acid (85% grade), from about 5 to about 25% of a water soluble resin selected from the class consisting of hydroxmethylcellulose, methylcellulose, polyvinyl alcohol, and polyacrylamide, from about 5 to about 20% of a rust inhibitor, said rust inhibitor containing from about 25 to about 95% by weight of sodium benzoate and from about 5 to about 75% by weight of potassium tripolyphosphate, from about 1 to about 10% of a wetting agent and an amount of water to bring the total amount of ingredients to 100%.

2. A rust preventative for metallic surfaces as in claim 1, wherein said phosphoric acid range is from about 20 to about 30%.

3. A rust preventative for metallic surfaces as in claim 2, wherein said sodium benzoate range is from about 65 to about 95% and said potassium tripolyphosphate range is from 5 to about 35%.

4. A rust preventative for metallic surfaces as in claim 3, wherein the amount of said phosphoric acid is approximately 25%.

5. A rust preventative for metallic surfaces as in claim 3, wherein said water soluble resin range is from about 5 to about 15%.

6. A rust preventative for metallic surfaces as in claim 5, wherein the amount of said water soluble resin is approximately 10%.

7. A rust preventative for metallic surfaces as in claim 3, wherein said water soluble resin is polyvinyl alcohol.

8. A rust preventative for metallic surfaces as in claim 3, wherein the amount of rust inhibitor is approximately 10%.

9. A rust preventative for metallic surfaces as in claim 3, wherein the amount of said sodium benzoate is approximately 80% and the amount of said potassium tripolyphosphate is approximately 20%.

10. A rust preventative for metallic surfaces as in claim 3, wherein the amount of said wetting agent is approximately 5%.

11. A rust preventative for metallic surfaces as in claim 3, wherein said wetting agent is selected from the class consisting of sodium dialkyl sulfosuccinates, naphthalenesulfonates and sodium alkyl sulfates.

12. A rust preventative for metallic surfaces as in claim 11, wherein said wetting agents are selected from the class consisting of sodium heptadecyl sulfate, sodium tetradecyl sulfate and sodium 2-ethylhexyl sulfate.

* * * * *